United States Patent [19]

Perkinson et al.

[11] Patent Number: 4,805,658
[45] Date of Patent: Feb. 21, 1989

[54] VARIABLE PRESSURE REGULATING VALVE

[75] Inventors: Robert H. Perkinson, Somers; Charles E. Reuter, Granby, both of Conn.

[73] Assignee: United Technologies Corporation, Hartford, Conn.

[21] Appl. No.: 42,080

[22] Filed: Apr. 24, 1987

[51] Int. Cl.$^4$ ............... F16K 17/36; G05D 11/00
[52] U.S. Cl. ............... 137/81.1; 137/117; 60/39.281
[58] Field of Search ............... 137/81.1, 569, 117, 137/80; 60/602, 39.75, 39.83, 39.281

[56] References Cited

U.S. PATENT DOCUMENTS

| | | | |
|---|---|---|---|
| 1,471,417 | 10/1923 | Rateau. | |
| 2,598,674 | 6/1952 | Burgess | 137/81.1 |
| 2,605,709 | 8/1952 | Jubb | 137/81.1 |
| 2,669,245 | 2/1954 | Walker | 137/81.1 |
| 2,706,885 | 4/1955 | Ostroff et al. | 137/81.1 |
| 2,873,754 | 2/1959 | Dunaway | 137/81.1 |
| 3,106,934 | 10/1963 | Rogers et al. | 137/117 |
| 3,234,730 | 2/1966 | Dettweiler et al. | 137/117 |
| 3,374,800 | 3/1968 | Wheeler et al. | 137/117 |
| 3,572,356 | 3/1971 | Pinto | 137/81 |
| 3,620,011 | 11/1971 | Urban et al. | 60/39.28 |
| 3,752,175 | 8/1973 | Hamilton et al. | 137/81 |
| 3,757,639 | 9/1973 | Baum et al. | 91/47 |
| 3,878,676 | 4/1975 | Hitzelberger | 60/39.281 |
| 3,952,773 | 4/1976 | Hahn | 137/604 |
| 4,066,091 | 1/1978 | Itoh et al. | 137/79 |
| 4,114,808 | 9/1978 | Saylor | 236/87 |
| 4,391,290 | 7/1983 | Williams | 137/81.1 |

FOREIGN PATENT DOCUMENTS

| | | | |
|---|---|---|---|
| 157451 | 8/1952 | Australia | 137/81.1 |
| 481835 | 3/1952 | Canada | 137/81.1 |
| 846063 | 8/1952 | Fed. Rep. of Germany | 137/81.1 |

Primary Examiner—A. Michael Chambers
Attorney, Agent, or Firm—Lloyd D. Doigan

[57] ABSTRACT

A pressure regulating valve 10 determines a fixed constant pressure drop across a metering valve 16 at a given altitude by comparing ambient pressure with a vacuum. Evacuated bellows 76 reacts with changes in altitude to bias a poppet 54 via rod 90, adjusting screw 100 and lever 66 towards or away from outlet 54.

7 Claims, 1 Drawing Sheet

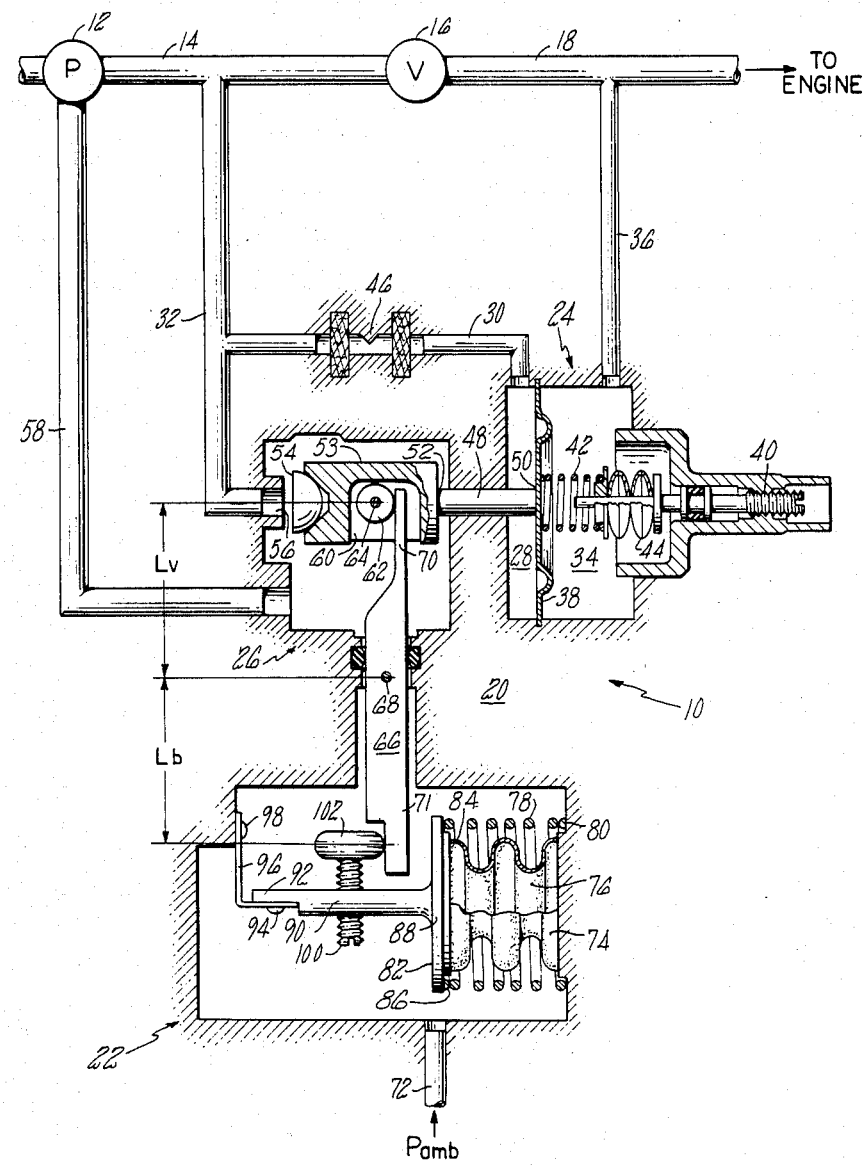

4,805,658

VARIABLE PRESSURE REGULATING VALVE

TECHNICAL FIELD

This invention relates to a pressure regulating valve for use within the fuel control of a gas turbine engine.

BACKGROUND ART

A fuel control meters fuel to a gas turbine engine. The fuel control, simplisticly speaking, includes a pressure regulating valve (PRV) and a metering valve. The PRV maintains a pressure drop of the fuel across the metering valve at a fixed constant. By maintaining the pressure drop across the metering valve, an accurate weight flow ($W_F$) of fuel may be provided to the gas turbine engine. However, a fixed constant pressure drop may not be desireable for all altitudes. At higher altitudes engines generally require less fuel to maintain engine power so that a smaller constant pressure drop across the metering valve is required. Conversely, at lower altitudes engines require more fuel to maintain engine power so that a greater constant pressure drop across the metering valve is required.

U.S. Pat. No. 2,605,709 to Jubb entitled "FUEL METERING MEANS FOR GAS TURBINE ENGINE FUEL SYSTEMS" shows a valve that controls the output of a variable displacement fuel pump to control the volumetric supply of fuel to provide the proper amount of fuel to a gas turbine engine at given altitudes. Variable fuel pumps are complicated and may be unreliable.

Other types of pressure regulation are sought and it is to this end the present invention is directed.

DISCLOSURE OF THE INVENTION

It is an object of the invention to provide a pressure regulating valve that provides an appropriate constant pressure drop for the altitudes encountered by a fuel control.

It is a further object of the invention to provide a simplified, reliable pressure regulating valve.

These and other objects of the invention is accomplished by providing a pressure regulating valve with external means for adjusting the constant pressure drop across a metering valve as a function of altitude by comparing ambient pressure (Pamb) with a vacuum.

A diaphragm positions a poppet valve to bypass fuel from a fuel supply line by comparing the pressure of fuel within a fuel supply line with the pressure of fuel passing from the metering valve. A lever biases the position of the poppet valve by comparing ambient pressure to a vacuum. By biasing the position of the poppet valve according to ambient pressure (i.e., altitude) the pressure regulating valve adjusts the constant pressure drop as a function of altitude.

These and other objects, features and advantages of the present invention will become more apparent in light of the detailed description of a best mode embodiment thereof, as illustrated in the accompanying drawing.

BRIEF DESCRIPTION OF THE DRAWING

The FIGURE is a perspective view, partially cut away, of the pressure regulating valve of the invention.

BEST MODE FOR CARRYING OUT THE INVENTION

The pressure regulating valve (PRV) 10 as shown is designed for use within a fuel control for a gas turbine engine. The embodiment of the invention described herein is designed to meter fuel to a gas turbine engine used in a helicopter which has an effective ceiling of approximately 20,000 feet.

Fuel is impelled by a fixed displacement pump 12 through a supply line 14 at a supply pressure to a metering valve 16. The metering valve in turn directs metered fuel through a metered line 18 to the gas turbine engine (not shown). Fuel metered through the valve passes therefrom at a modulated pressure.

The PRV of the invention is contained in three chambers of a fuel control housing 20; an atmospheric chamber 22, a comparison chamber 24, and a bypass chamber 26.

Fuel is ported from the supply line 14 at supply pressure to first side portion 28 of the comparison chamber via a first sense line 30 and bypass line 32. Fuel is ported from the metered line 18 at modulated pressure to a second side portion 34 of the comparison chamber via a second sense line 36. A flexible diaphragm 38 separates the chamber side portions thereby separating the fuel at supply pressure from the fuel at the modulated pressure. The diaphragm positions itself relative to the fluid pressure differential of the fuel at supply pressure and the fuel at metered pressure.

A diaphragm adjusting screw 40 varies the load of spring 42 upon the diaphragm 38 to adjust the regulated pressure drop for given flight requirements. A pair of bi-metallic disks 44 further adjust the load of the spring 42 upon the diaphragm to offset pressure changes caused by temperature variations. The disks are typically formed of Invar ® and copper-nickel alloys as is well known in the art. A damping orifice 46 is provided in the sense line to minimize undesireable oscillation of the diaphragm caused by minor variations in supply pressure. A cylindrical rod 48 attaches at a first end 50 thereof to the diaphragm and protrudes through the housing into the bypass chamber 26.

A second end 52 of the rod 48 attaches to a piston 53 having a concave end portion which centers a poppet 54 against the outlet nozzle 56 of the bypass line 32. The outlet nozzle 56 has the same diameter as the rod 48. By utilizing diameters, the supply pressure provided by the fuel flowing through line 32 is transferred by the rod 48 to the diaphragm 38 so that the diaphragm reacts to the full pressure drop thereacross. The diaphragm provides a more accurate pressure comparison relatively unaffected by any variation in the pressure level of the bypass chamber. The bypass line 32 branches off the supply line 14 into the bypass chamber. A return line 58 carries fluid ported by the poppet from the bypass line back to the pump. The piston has a roughly rectangular cut out area 60. A wheel 62 is rotatably mounted within the cut out by an axle 64. A lever 66 which balances about a pivot point 68 within the housing, has a first end portion 70 abutting the wheel and a second end portion 71 protruding into the atmospheric chamber 22.

The atmospheric chamber 22 has a line 72 porting air at ambient pressure (Pamb) thereto. A first end 74 of an evacuated bellows 76 attaches to the housing within the chamber. A bellows spring 78 surrounds the evacuated bellows and also has a first end 80 abutting the housing. A spring seat 82 abuts the second end 84 of the bellows and the second end 86 of the spring. A first end portion 88 of a rod 90 attaches to the spring seat 82 and a second end portion 92 of the rod attaches to a first end portion 94 of a flexure 96. The flexure attaches at a second end portion 98 to the housing 20. The flexure insures that the rod moves linearly as the bellows contracts and expands. An adjustment screw 100 is provided through a midpoint of the rod. A knob end 102 of the screw abuts the second end portion 71 of the lever 60.

In operation, air at ambient pressure is ported to the atmospheric chamber. At lower altitudes, higher ambient pressures are encountered which tend to compress the evacuated bellows 76. The evacuated bellows, in turn, pulls the rod 90 which, through the adjusting screw 100, pivots the second end portion 71 of the lever 66 towards the bellows. As a result, the first end portion 70 of the lever which engages the wheel, pivots towards the nozzle outlet 56 moving the cylinder towards that outlet. The piston 53, which reciprocates towards and away from the outlet by the pressure comparison performed by the diaphragm via rod 48, is biased towards the nozzle outlet by the lever. The amount of fuel that can be ported by the poppet through the bypass drops, increasing the supply pressure of the fuel to the metering valve and increasing the pressure drop across the valve. Since the engine requires more fuel at lower altitudes, a higher pressure drop ensures a greater delivery of fuel.

Conversely at higher altitudes, the evacuated bellows, in conjunction with the bellows spring tends to push the rod away from the bellows, diminishing the bias provided by the lever on the cylinder. The poppet may port more fuel, decreasing the supply pressure of the fuel to the metering valve and decreasing the pressure drop across the valve. Since the engine requires less fuel at higher altitudes a lower pressure drop ensures a lesser delivery of fuel to the engine.

The pressure drop across the metering valve is determined by the following force balance equation:

$$P_{mv} = (Lr((Pamb)(Ab) - Fbs)) + Fts)/Ad$$

Pmv: Metering valve Pressure drop
Lr: Lever Ratio=Lb/Lv=1.56
Pamb: Ambient Pressure=6.7-14.7 PSIA
Ab: Bellows Area=1.94 sq. in.
Fbs: Bellows Spring Preload=12.1 lbs
Fts: Trim Spring Load=4.9 lbs
Ad: Diaphragm Area=0.51 sq. in.

One can readily see that the change in pressure drop is a function of ambient pressure (Pamb), all other parameters being fixed.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. Apparatus for metering the weight flow of fuel (WF) to a gas turbine engine characterized by:
   a metering valve for metering said weight flow,
   PRV means for providing a constant pressure drop across said fuel metering valve by comparing a supply pressure of said weight flow with a metered pressure of said weight flow, said PRV means variably porting said weight flow as a result of said comparison to maintain said constant pressure drop; and
   external means for comparing ambient pressure with a vacuum and for adjusting the variable porting of said PRV means as a function of comparing ambient pressure with a vacuum such that said PRV means provides a distinct constant pressure drop for each altitude.

2. The apparatus of claim 8 wherein said external means is characterized by:
   a chamber;
   a means for providing a vacuum in said chamber;
   a means for introducing said ambient pressure into said chamber; and
   means for comparing said ambient pressure with said vacuum in said chamber, said means for comparing said ambient pressure adjusting said PRV means as a result of said comparison.

3. The apparatus of claim 1, wherein said PRV means is characterized by:
   a means for comparing said supply pressure with said metered pressure; and
   a means attaching to said means for comparing said supply pressure with said metered pressure for porting fuel from said supply means as said means for comparing said supply pressure with said metered pressure compares said supply pressure with said metered pressure.

4. The apparatus of claim 3, wherein said external means is characterized by:
   a chamber;
   a means for providing a vacuum in said chamber;
   a means for introducing said ambient pressure into said chamber; and
   means for comparing said ambient pressure with said vacuum in said chamber said means for comparing said ambient pressure adjusting said means for porting fuel as a result of said comparison.

5. The apparatus of claim 3, wherein said means for porting fuel is characterized by:
   a rod having a first end attaching to said means for comparing said supply pressure with said metered pressure and a second end positioning a poppet towards and away from a fuel outlet nozzle.

6. The apparatus of claim 5, wherein said external means is characterized by:
   a chamber;
   a vacuum means for providing a vacuum in said chamber;
   a means for introducing said ambient pressure into said chamber; and
   means for comparing said ambient pressure with said vacuum in said chamber said means for comparing said ambient pressure adjusting said rod in relation to said fuel outlet nozzle.

7. The apparatus of claim 5 characterized by:
   said first end of said rod having a same diameter as said fuel outlet nozzle such that a full pressure drop across said fuel metering valve is sensed by said means for comparing said supply pressure with said metered pressure.

* * * * *